United States Patent [19]

Hehl

[11] 4,386,626

[45] Jun. 7, 1983

[54] PROPORTIONAL VALVE FOR HYDRAULIC SYSTEMS

[76] Inventor: Karl Hehl, Arthur-Hehl Strasse 32, D-7298 Lossburg 1, Fed. Rep. of Germany

[21] Appl. No.: 140,701

[22] Filed: Apr. 16, 1980

[30] Foreign Application Priority Data

Apr. 21, 1979 [DE] Fed. Rep. of Germany ....... 2916172

[51] Int. Cl.³ .............................................. F16K 31/04
[52] U.S. Cl. .................................. 137/529; 137/540; 251/129; 361/159; 318/687
[58] Field of Search ................ 251/129; 137/529, 540, 137/487.5; 361/159; 123/490; 425/135, 150, 451.2; 318/687

[56] References Cited

U.S. PATENT DOCUMENTS

| 3,922,587 | 11/1975 | Jones | 361/159 |
|---|---|---|---|
| 3,938,778 | 2/1976 | Hansen et al. | 251/129 |
| 3,967,648 | 7/1976 | Tirelli | 251/129 X |
| 4,017,056 | 4/1977 | Schwalenstocker et al. | 251/131 |
| 4,161,962 | 7/1979 | Maringer et al. | 123/490 X |

FOREIGN PATENT DOCUMENTS

| 2528963 | 1/1977 | Fed. Rep. of Germany . |
|---|---|---|
| 716737 | 10/1954 | United Kingdom . |
| 1323878 | 7/1973 | United Kingdom . |
| 1425826 | 2/1976 | United Kingdom . |
| 1550940 | 8/1979 | United Kingdom . |
| 1560024 | 1/1980 | United Kingdom . |

OTHER PUBLICATIONS

"Olhydraulik und Pneumatik", [Oil Hydraulics and Pneumatics], vol. 21, (1977), No. 10, pp. 722-724, 727-729.
"Plasverarbeiter", [Plastic Worker], No. 9/78, pp. 475-479.

*Primary Examiner*—Arnold Rosenthal
*Attorney, Agent, or Firm*—Spencer & Kaye

[57] ABSTRACT

In order to correct non-linearities inherently existing in the relation between the value of a hydraulic fluid parameter controlled by a proportional valve and an operating signal controlling the valve, in an arrangement in which the setting of the valve is controlled by effecting a comparison between the operating signal and a feedback signal representing the valve movement, a memory is provided to modify one of those signals prior to comparison in a manner to compensate for such non-linearities.

11 Claims, 6 Drawing Figures

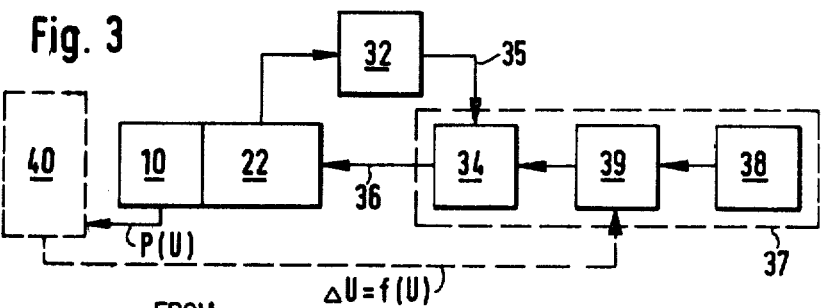
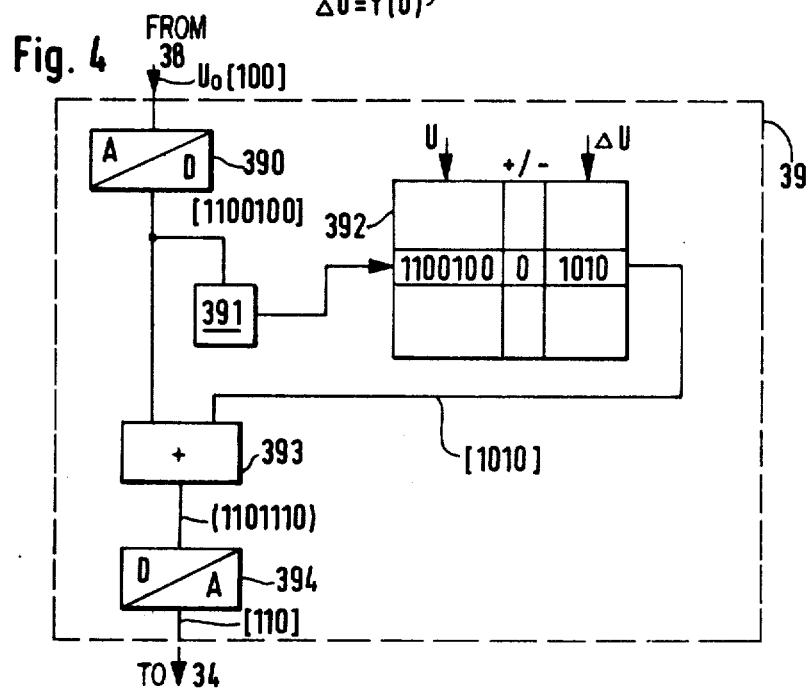
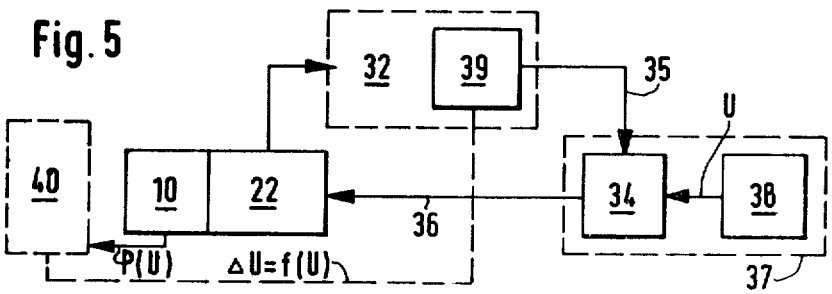

PROPORTIONAL VALVE FOR HYDRAULIC SYSTEMS

BACKGROUND OF THE INVENTION

The present invention relates to a proportional valve for hydraulic systems to control a parameter, such as the pressure or flow rate, of the hydraulic medium. For this purpose, the valve may be supplied with a control value, in particular a control voltage, and may be associated with a proportional magnet whose axial displacement is monitored to produce a displacement-proportional signal which is fed, via a path measuring unit, as the control value to an amplifier whose output signal effects the corresponding displacement by acting on the proportional magnet.

Such a proportional valve is disclosed in the periodical "OLHYDRAULIK UND PNEUMATIK" [Oil Hydraulics and Pneumatics], Volume 21, (1977) No. 10, at pages 722–24 and 727–29.

German Offenlegungsschrift [laid-open application] No. 2,528,963 also discloses a hydraulic control device using proportional valves in which the proportional magnets are disposed in a control circuit whose control value is derived from the axial displacement of the magnetic core of the proportional magnet.

This prior art valve position control circuit serves to adapt the magnetic current to fluctuations in the load and compensates for heating of the coil. The output value the proportional valve produces in the end, e.g. dependent on pressure or flow rate, depends, however, on the structural design of the other mechanical and hydraulic components of the device.

The advantages of the use of proportional valves in hydraulic drive systems of the type in question are essentially the savings in energy due to lossfree adaptation of pressure and flow to actual requirements and the remotely controllable pressure regulation as an analog function of the electrical desired value signals, the load independent flow regulation, and finally relatively short control times with high accuracy. It would certainly be desirable to be able, even for relatively high requirements, to dispense with extremely costly hydraulic servo systems in a closed control circuit with electronic comparison and matching of desired and actual values employing the output value as the control value in favor of proportional valves since the latter assure input signal dependent proportional control in both directions of movement without requiring a closed control circuit with electronic feedback of the actual value. Experience has shown, however, that the use of proportional valves, whose hydraulic component exhibits disproportionalities with respect to pressure and quantity flow rate, is no longer justified when the demands are high, e.g. in the manufacture of high quality ejection molded objects. That is the reason why injection molding systems continue to use, for the hydraulic drives, hydraulic servo systems which represent a considerable portion of the manufacturing costs. Reference is made, with respect to the particularities of control, to the article *Ist Prozessregelung notwendig* [Is Process Control Necessary] appearing in PLASTVERARBEITER [Plastic Worker], No. 9/78, pages 475 et seq.

A particular drawback of using a control circuit for relating the output value in the form of an actual value to the given desired value is also that the control constant is very high, i.e. the response time for the return to the desired value is relatively long, so that the control circuit tends to perform control oscillations which make its behavior unstable.

SUMMARY OF THE INVENTION

Based on the above, it is an object of the present invention to improve a proportional valve of the above-mentioned type in such a manner that improved proportional control of the hydraulic parameters, such as pressure and flow rate, is accomplished with a proportionality to the control value which is high compared to that attained with hydraulic servo systems.

This and other objects are achieved, according to the invention, in a proportional valve arranged to control a parameter of a hydraulic medium in a hydraulic medium flow path, which valve includes a movable flow-influencing component disposed in the path for causing the value of the parameter to be dependent on the position of the component, movable actuating means connected to the component for moving the component in response to movement of the actuating means and connected to receive a control signal the value of which determines the position to which the actuating means moves, position monitoring means connected to the actuating means and having an output providing a response signal having a value representative of the position of the actuating means, and control means having a first input connected with a source of an externally derived operating signal having a value representative of the desired value of the hydraulic medium parameter, a second input connected in circuit with the output of the position monitoring means, and an output connected to provide the control signal and operative for giving the control signal a value such that the actuating means is moved to a position at which a predetermined relationship is established between the values of the signals at its inputs, whereby the value of the parameter determined by the position of the valve component is a single-valued, but inherently non-linear, function of the value of the operating signal, by the provision of non-linearity correcting means connected ahead of one of the inputs of the control means for giving the signal supplied to that input a value which compensates for the non-linearity of the parameter value-to-operating signal value function.

A valve constructed according to the present invention enables less skilled personnel to operate an injection molding machine because readjustment of the control circuit, which is required when a servovalve is replaced, is no longer necessary. Moreover, the danger of damage to the hydraulic system, which exists in a hydraulic servo system with closed control circuit when there is a malfunction of essential hydraulic functions, is avoided. In this connection it should be noted that the hydraulic drive of an injection molding system of conventional design requires the use of proportional valves and includes four to eight such valves of which, at most, one or two can be equipped with a hydraulic servo system, i.e. regulation of its output value, so as to keep costs at an acceptable level. That means that the hydraulic system possesses the disproportionalities of the proportional valves in the regions of the valves not equipped with the hydraulic servo system. This is where the present invention brings effective help.

BRIEF DESCRIPTION OF THE DRAWINGS

FIG. 3 is a block circuit diagram of a first preferred embodiment of a proportional valve according to the present invention using the proportional valve according to FIG. 1 with a characteristic as shown in FIG. 2.

FIG. 4 is a detail view of one embodiment of the correction circuit of the circuit of FIG. 3.

FIG. 5 is a block circuit diagram of a second preferred embodiment of a proportional valve according to the invention.

DESCRIPTION OF THE PREFERRED EMBODIMENTS

Figure 1:
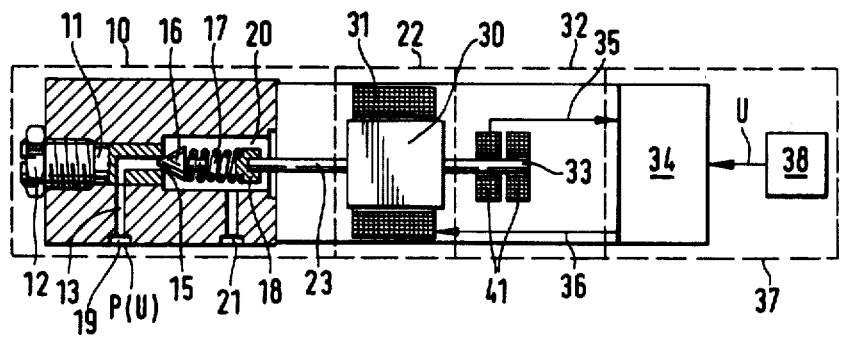
FIG. 1 is a partly cross-sectional, partly schematic, view of a proportional pressure valve unit used in embodiments of the invention.

The proportional pressure valve shown in FIG. 1 consists essentially of a valve block 10, a proportional magnet 22, a magnet core displacement measuring unit 32 and an electronic control unit 37.

A valve seat 11 is secured by means of a nut 12 to be axially adjustable in the valve housing. The housing presents a cylindrical valve chamber 20, in which a conical valve disc 16 is coaxially disposed and guided in a centering manner. When the pressure valve is closed, the tip 15 of the valve disc 16 enters into the pressure channel 13. The pressure generated in that channel is available at the pressure channel terminal 19.

In order to control the position of the valve disc 16 via a spring 17, a proportional magnet 22 is provided which is itself composed of a coil 31 and a magnetic core 30. The magnetic core 30 is connected to a support 18 for spring 17 via a magnetic core plunger 23.

An electronic unit 37, which includes a control device 38 and an amplifier 34, is connected to the coil 31 of the proportional magnet 22 via a control line 36 and supplies a current which produces a magnetic field that provokes a displacement of the magnetic core 30 and thus varies the force on the spring support 18 via the magnetic core plunger 23.

Due to the unavoidable hysteresis, and for the reasons explained above, i.e. due to the dependence of the force effect of the magnetic core 30 on the intensity of the control current in control line 36 with decreasing or increasing values of such control current, it is customary to provide a displacement measuring unit 32 which measures the displacement of the magnetic core 30 in response to the control current in the control line 36.

A displacement transducing rod 33 which is fastened to the magnetic core and which is surrounded by a sensing coil 41 serves for this purpose. By means of various electronic accessories the measuring unit 32 generates a feedback signal which is fed via a feedback line 35 to the amplifier 34 and itself influences the magnitude of the control signal in the control line 36. Thus, this constitutes a control circuit in which the displacement of the magnetic core 30 is the control value.

This control value itself depends on a control voltage U fed to the amplifier 34 by the control device 38. A certain desired value for the displacement of the magnetic core 30 is thus dependent on the value of the control voltage U and the actual displacement is brought to this desired value by means of the control signal in control line 36 until the desired value of the displacement and the actual value of the displacement, the latter being indicated by the signal in line 35, coincide.

In order to create the measuring unit 32 it is known to obtain the feedback signal in the return line 35 by designing the coil 41 as part of a resonant circuit operated by an oscillator. The movement of core 33 in and out of the coil 41 results in a change in inductance and thus in a change in the resonant frequency of this resonant circuit. By use of a suitable rectifier circuit it is possible to utilize the superposition of the oscillator frequency and this resonant frequency in order to obtain the feedback signals.

Such a displacement measuring unit 32 would be unnecessary only if it were possible to reduce the hysteresis phenomena of the proportional magnet 22 to a negligible level.

A proportional pressure valve having the form shown in FIG. 1 therefore generates at port 19 output pressure p which varies as a function of control voltage U, or stated briefly: $p = f(U)$.

Such a functional relationship can be identified as the pressure control/voltage characteristic. A typical characteristic for a proportional pressure valve is shown in FIG. 2.

Figure 2:
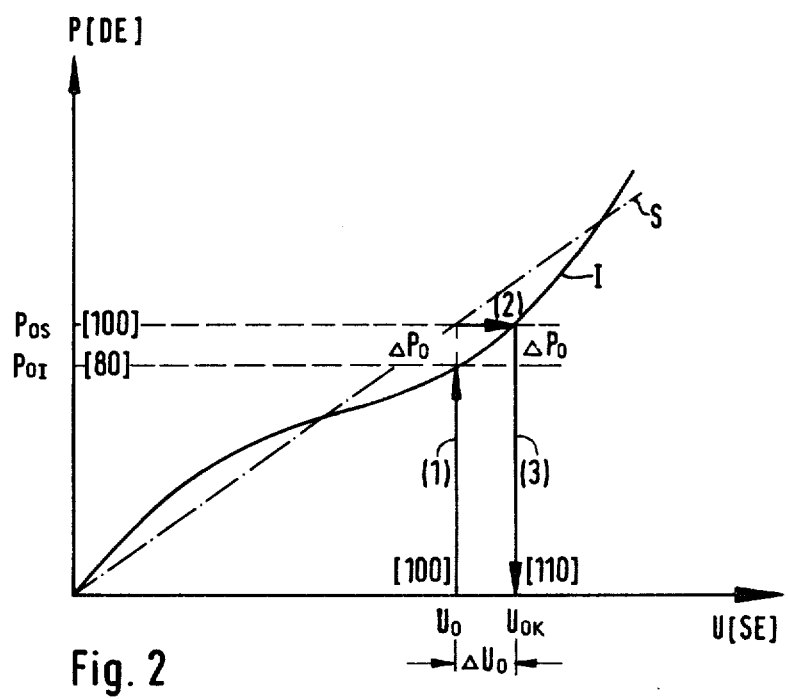
FIG. 2 is a diagram showing the pressure control signal characteristic of the pressure proportional valve shown in FIG. 1.

In a diagram of FIG. 2 the control voltage U provided by the control device 38 of FIG. 1 is plotted on the abscissa in units of voltage SE; the output pressure p at the pressure channel terminal, or port, 19 of FIG. 1 is plotted on the ordinate in units of pressure DE.

As indicated by the name of the valve, the output pressure p in the ideal case would be proportional to the control voltage U. The resulting linear characteristic is shown in FIG. 2 by a dot-dash line constituting the desired value curve S.

Due to irregularities and deviations in the hydraulic portion of the proportional pressure valve, however, the actual response characteristic departs from this value as shown in FIG. 2 by the curve I for the actual value. These deviations are valve-specific, i.e. each proportional pressure valve has a slightly different actual pressure/control voltage characteristic.

In principle it is now possible to determine, by means of a control circuit, the deviation between the desired pressure and the actual pressure for a certain value of the control voltage U and to feed it to the amplifier 34 (FIG. 1), i.e. to use the output pressure p as the control value.

However, for the above-mentioned reasons, the present invention does not do that. Rather the idea of the invention is to determine from this valve-specific characteristic the differences between the actual value of the output pressure p and the desired value of the output pressure p for a certain number of values of the input control voltages U, to store corresponding correction values and to correct with them the input signal to the amplifier 34.

This can be accomplished by recording the characteristic shown in FIG. 2 for each proportional pressure valve on a test stand 40, represented in FIGS. 3 and 5. The pairs of values in FIG. 2 are intended to illustrate how a correction signal for the control voltage U can be determined.

Let it be assumed that the control voltage U has a value $U_O = 100$ voltage units. With a linear characteristic according to line S this would correspond to an output pressure $P_{OS}$ of 100 pressure units.

In fact, measurement reveals that the output pressure $P_{OI}$ realized with this control voltage is only 80 pressure units as indicated by the arrow (1). However, consideration of the actual characteristic I of this pressure valve indicates that it is possible to attain the desired proportional output pressure $P_{OS}$ of 100 pressure units if the associated control voltage value $U_{OK}$ along curve I is searched out along the line indicated by arrow (2), which in the illustrated embodiment lies at 110 voltage units as can be ascertained by projection of arrow (3) from the actual curve I to the abscissa.

To obtain the desired output pressure $P_{OS}$ it is therefore necessary to superpose a correction voltage $\Delta U_O$ on the original control voltage $U_O$. The following relationship thus applies: $\Delta U_O = U_{OK} - U_O$.

When recording the characteristic for each pressure valve it is thus possible to compile a table which gives the associated correction voltage $\Delta U_O$ for each control voltage $U_O$. Depending on the required accuracy, several hundred or thousand pairs of values can be measured.

FIG. 3 shows a first embodiment of a proportional valve according to the invention in which the characteristic determined on the test stand 40 in the form of pairs of values has been fed into a correction circuit 39 as shown by the broken line arrow in FIG. 3. The electronic unit 37 according to the invention comprises the control device 38, the correction circuit 39 and the connected amplifier 34. As already shown by the structural illustration in FIG. 1, the amplifier 34 controls the proportional magnet 22 via the control line 36 and a signal representing the displacement of the proportional magnet 22 is again fed by the measuring unit 32 via the feedback line 35 to the amplifier 34, thus forming a control circuit which utilizes the displacement of the proportional magnet 22 as the control value. Finally, the proportional magnet 22 establishes the desired output pressure p (U) via the mechanical and hydraulic devices of the valve block 10.

Consequently, in this embodiment control of the position of the proportional magnet 22 is effected by means of the value table $\Delta U = f(U)$ to establish a linear characteristic as shown by the line S in FIG. 2. Thus, according to the invention, it is not the output pressure p(U) which is used as the control value, but rather, a preliminary determination has been made, i.e. by the table within the correction circuit 39, of the correction values which are added to the control voltage U in dependence on its value. The control circuit using the displacement of the proportional magnet 22 as the control value merely serves to transform the output signals of the amplifier on the control line 36 into a corresponding displacement of the proportional magnet 22.

FIG. 4 shows one suitable embodiment of the correction circuit 39 of FIG. 3. A numerical example which coincides with the numerical example of the characteristic of FIG. 2 will be used for explanation purposes. The control voltage $U_O$ which comes from the control circuit 38 to the correction circuit 39 has a value of 100 voltage units. An analog/digital converter 390 converts this value to the associated binary value 1100100 which is then fed to the addressing circuit 391 of a fixed value memory (ROM) 392. The fixed value memory 392 was previously programmed to contain the table of values $\Delta U = f(U)$ as determined on the test stand 40. The control voltages U for which associated correction values $\Delta U$ have been determined are thus stored in the address portion of the fixed value memory. The addressing circuit 391 thus actuates that line of the fixed value memory 392 which has an address equal to the value of the control voltage U, in the illustrated example the address 1100100. The associated difference value $\Delta U$ is 10 voltages units, as shown in FIG. 2, i.e., in binary representation, 1010. This corection value $\Delta U$ and associated sign (+/−) information is read out and fed, together with the binary value of the control voltage U, to a binary adder 393 which, based on the special sign information in the fixed value memory (+/− column), modifies the control voltage U by this correction value, thus generating a binary value 1101110 corresponding to the decimal value 110. This value is fed to a digital-/analog converter 394 which finally transmits as its output signal the value 110 for 110 voltage units to the amplifier 34.

It is of course also possible to feed the corrected control voltage values $U_k$ directly into the fixed value memory 392 instead of the difference values $\Delta U$ and to read out these corrected values, convert them to analog form and feed them to the amplifier 34. Depending on the circuit design of the amplifier 34 or of the control device 38, respectively, the analog/digital conversion or the digital/analog conversion, respectively, may also be eliminated under certain circumstances.

FIG. 5 shows a second embodiment of the control circuit according to the invention in which the correction circuit 39 is not disposed in the electronic unit 37 but in the displacement measuring unit 32. The correction member according to the invention is thus disposed in the control circuit of the displacement of the proportional magnet 22. Instead of the control voltage U of the control device 38, it is here the feedback signal in the feedback line 35 of the measuring unit 32 which is corrected as a function of the valve characteristic. It must be pointed out that this is not a regulation but a control of the output pressure p(U), only the correction member is disposed in the control circuit of the displacement path regulation which occurs, in any event.

When using the embodiment of FIG. 5 one may also use the correction circuit of FIG. 4; instead of pairs of values of the control voltage U the fixed value memory 392 stores paires of values of the feedback signal that is fed to its input instead of the control voltage U according the embodiment of FIG. 3.

Figure 6:
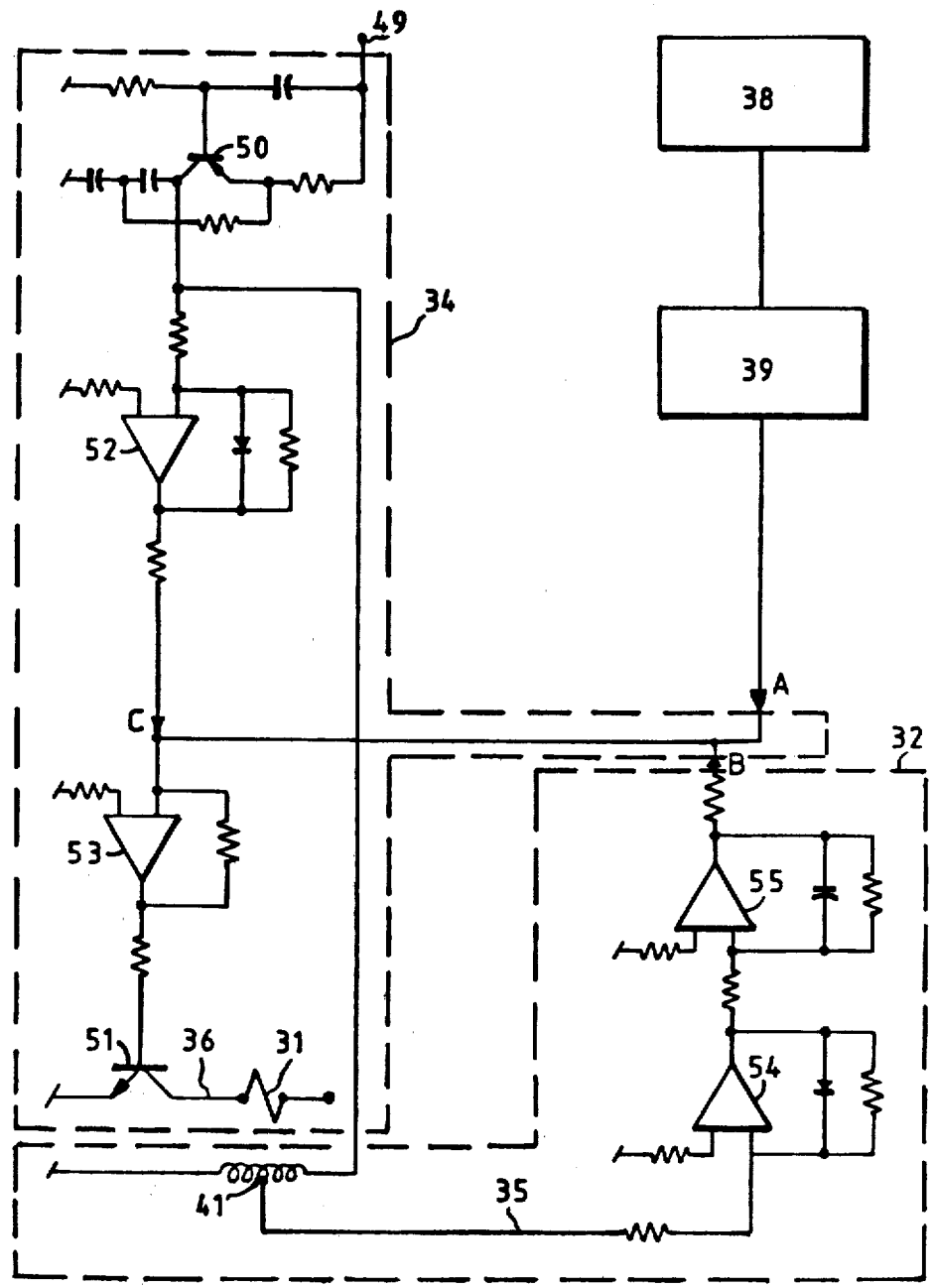
FIG. 6 is a circuit diagram of the first embodiment as shown in FIG. 3, showing the displacement masuring unit and the amplifier.

FIG. 6 shows a detail circuit diagram of the electronic features of the displacement measuring unit 32 and the amplifier 34 as well as their interconnection with the correction circuit 39 and control device 38 corresponding to the block diagram as shown in FIG. 3.

The amplifier 34 comprises an oscillator 50 fed by voltage supply 49. The oscillator 50 is connected to the sensing coil 41 and to a correction circuit 52 that serves to generate a correction signal due to voltage instabilities and/or thermal effects that cause fequency-drifting simulating a wrong actual position of the rod 33 in the sensing coil 41 by influencing the detecting components of the measuring unit 32. The output signal of correction circuit 52 therefore is added to the input signal of the amplifier 34, the input signal of amplifier 34 thus being a superposition of the output signal of correction circuit 39(=desired and corrected value of displacement of core 30), the output signal of measuring unit 32 (=actual value of displacement) and the correction signal mentioned above (these three signals are indicated by arrows A,B,C in FIG. 6, each signal may have +/− sign). This superposed input signal of amplifier 34 is connected to a preamplifier 53 and power-amplifier 51, the latter being connected to the coil 31 by control line 36, thus controling the axial displacement of magnetic core 30.

Movements of magnetic core 30 and rod 33 connected thereto influence the sensing coil 41 which is connected to the measuring unit 32 by return line 35.

The measuring unit comprises a two-stage rectifier- and amplification circuit 54, 55 that generates the feedback signal indicating the actual position of the magnetic core 30 being superposed to the other input signals of amplifier 34 as described above. In order to compare input signals A and B they can be subtracted from each other, thus the resulting input signal (correction signal C being neglected) A+B+C will equal zero, when the actual position of the magnetic core 30 (indicated by signal B) coincides with the desired position as given by the control device 38 and corrected by the correction circuit 39 (signal A). Hence, the amplifier 34 will produce an output signal on control line 36, that only compensates for the force of spring 17. In order to realise the embodiment of FIG. 5, all features described above are essentially the same; in this case Signal B is corrected by correction circuit 39 instead of signal A.

Thus the present invention makes it possible to avoid expensive and technologically disadvantageous control devices and instead to introduce a corrected control with which a highly accurate proportionality of the pressure/control voltage characteristic can be realized at little expense and to achieve this by various practical structures.

It must also be mentioned that the principles of the control device according to the present invention can of course also be used for other proportional valves, e.g. a quantity or flow rate proportional valve. In that case it is merely necessary to compile a table on a test stand reflecting the quantity dispensed instead of the output pressure p and to feed these values into a correction circuit according to the invention.

Such proportional pressure valves and/or proportional quantity valves are used, in particular, in injection molding machines. However, many other possible applications are known in which an almost linear characteristic is of significance without regulation.

Advisably, the hydraulic portion 10–21, the unit comprising, as the wet unit filled with pressure oil, the proportional magnet 22 and the measuring unit 32, as well as the electronic unit 37 form a single structural unit. Alternatively, at least the correction unit 39 can be a plug-in module which is individually constructed or programmed according to the particular valve characteristic.

It will be understood that the above description of the present invention is susceptible to various modifications, changes and adaptations, and the same are intended to be comprehended within the meaning and range of equivalents of the appended claims.

What is claimed is:

1. In a proportional valve arranged to control a parameter of a hydraulic medium in a hydraulic system of an injection molding machine, which valve includes a movable flow-influencing component disposed in a flow path of the system for causing the value of the parameter to be dependent on the position of the component, movable actuating means connected to the component for moving the component in response to movement of the actuating means and connected to receive a control signal the value of which determines the position to which the actuating means moves, position monitoring means connected to the actuating means and having an output providing a response signal having a value representative of the position of the actuating means, and control means having a first input connected with a source of an externally derived operating signal having a value representative of the desired value of the hydraulic medium parameter, a second input connected in circuit with the output of the position monitoring means, and an output connected to provide the control signal and operative for giving the control signal a value such that the actuating means is moved to a position at which a predetermined relationship is established between the values of the signals at its inputs, whereby the value of the parameter determined by the position of the valve component is a single-valued, but inherently non-linear, function of the value of the operating signal, the improvement comprising non-linearity correcting means connected ahead of one of said inputs of said control means for giving the signal supplied to that input a value which compensates for the non-linearity of said parameter value-to-operating signal value function, said correcting means comprising a memory storing a discrete correcting signal value for each of a selected plurality of discrete values of the signal associated with the input to which said correcting means are connected, each correcting signal value being selected on the basis of the measured parameter value-to-operating signal value function for said valve, whereby said correcting means constitute a structure for correcting for the form of such non-linearity which is specific to said valve.

2. An arrangement as defined in claim 1 wherein said actuating means comprise a proportional electromagnet and said control means comprise an amplifier.

3. An arrangement as defined in claim 1 wherein each discrete correcting signal value stored by said memory constitutes the value which the signal at said one of said inputs must have in order to compensate for the non-linearity of said function.

4. An arrangement as defined in claim 1 wherein each discrete correcting signal value stored in said memory constitutes the difference between the value which the signal at said one of said inputs must have in order to compensate for the non-linearity of said function and the actual value of the signal at that input, and said correcting means comprises a combining member connected for combining the signal associated with the input to which said correcting means are connected and the stored correcting signal value for the current value of the signal associated with that input and for supplying the combined signal value to that said input of said amplifier.

5. An arrangement as defined in claim 4 wherein said correcting means are connected between the source and said first input of said amplifier.

6. An arrangement as defined in claim 4 or 5 and wherein said correcting means are connected between said position monitoring means and said second input of said amplifier.

7. An arrangement as defined in claim 1 wherein said memory is a read-only memory having a plurality of memory locations each storing a correcting signal value and having an address corresponding to the associated discrete value of the signal associated with the input to which said correcting means are connected.

8. An arrangement as defined in claim 1 wherein said correcting means are constituted by a plug-in module individually adapted to a selected proportional valve.

9. An arrangement as defined in claim 1 wherein said actuating means comprise a proportional electromagnet and form a single structural unit with said position monitoring means.

10. An arrangement as defined in claim 1 wherein: said valve includes a hydraulic portion which includes said flow-influencing component; said actuating means comprise an electromagnet, said actuating means and said position monitoring means form a unit filled with pressure oil; and said hydraulic portion, said unit filled with oil and said control means together constitute one structural unit.

11. A plurality of valves and each as defined in claim 1 each forming part of the hydraulic system of the injection molding machine.

* * * * *